Nov. 29, 1938.  H. E. A. RABLE  2,138,204
COFFEE MILL
Filed July 9, 1936  6 Sheets-Sheet 1

Inventor:—
Hans E. A. Rabl
by his Attorneys

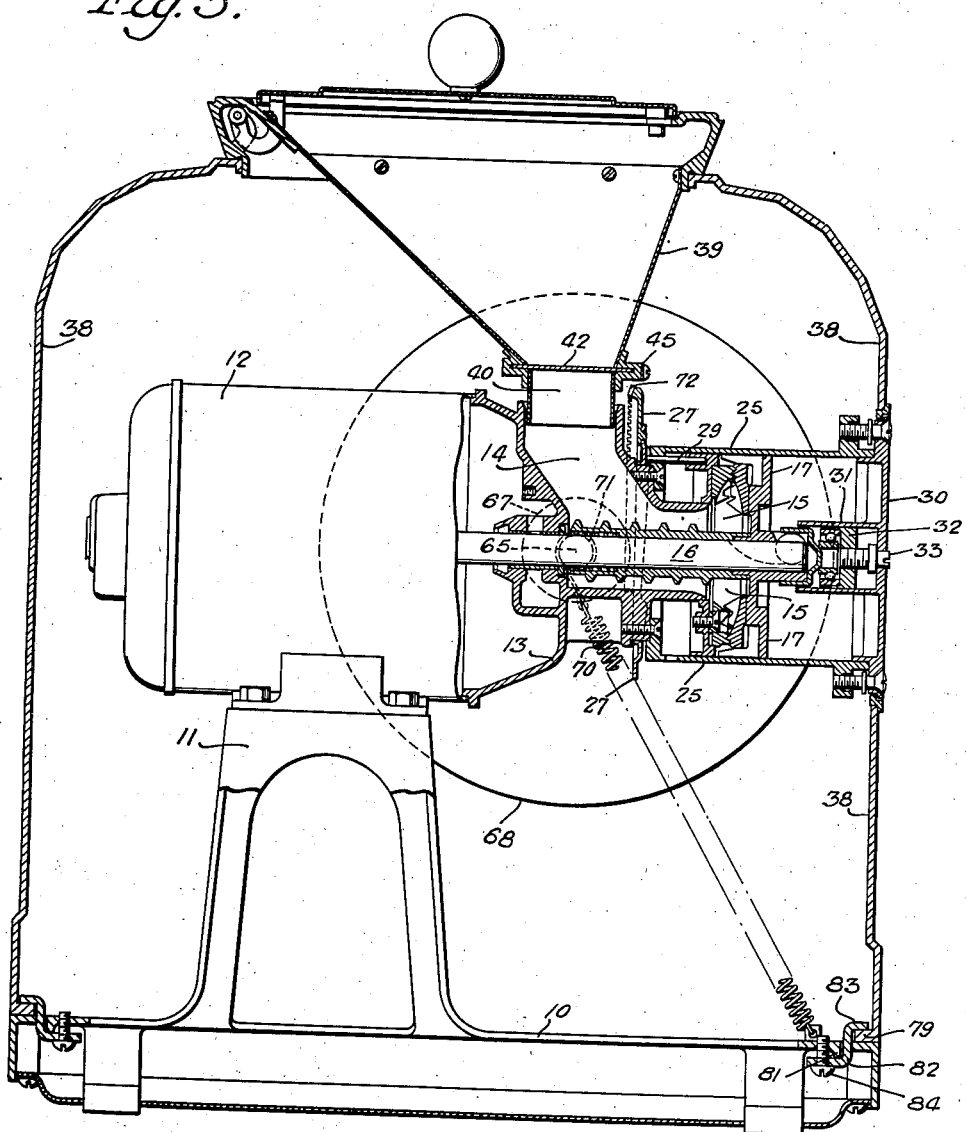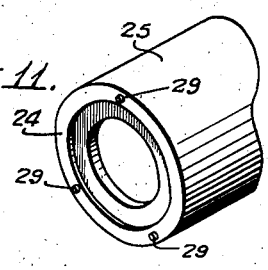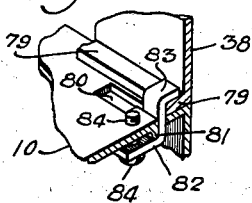

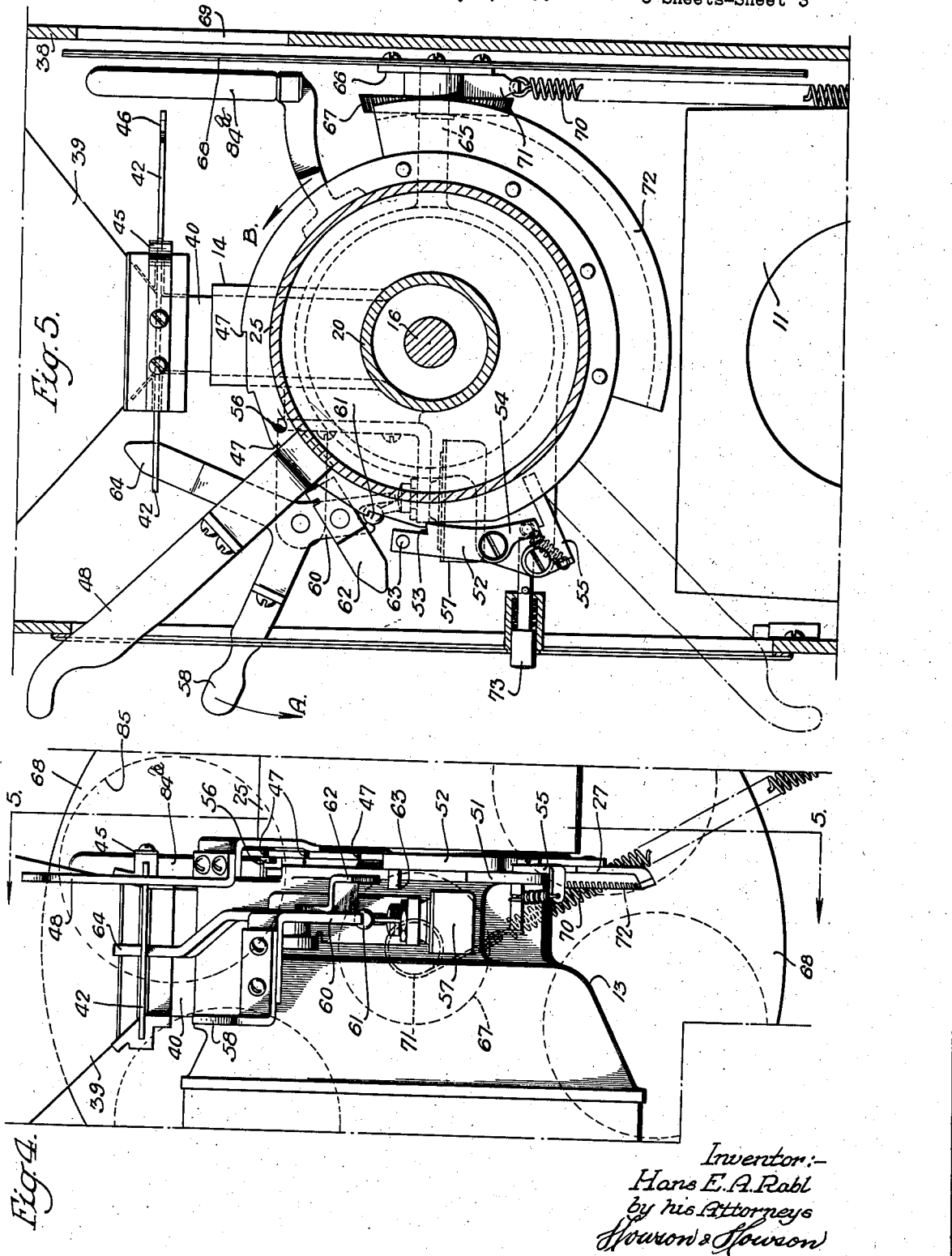

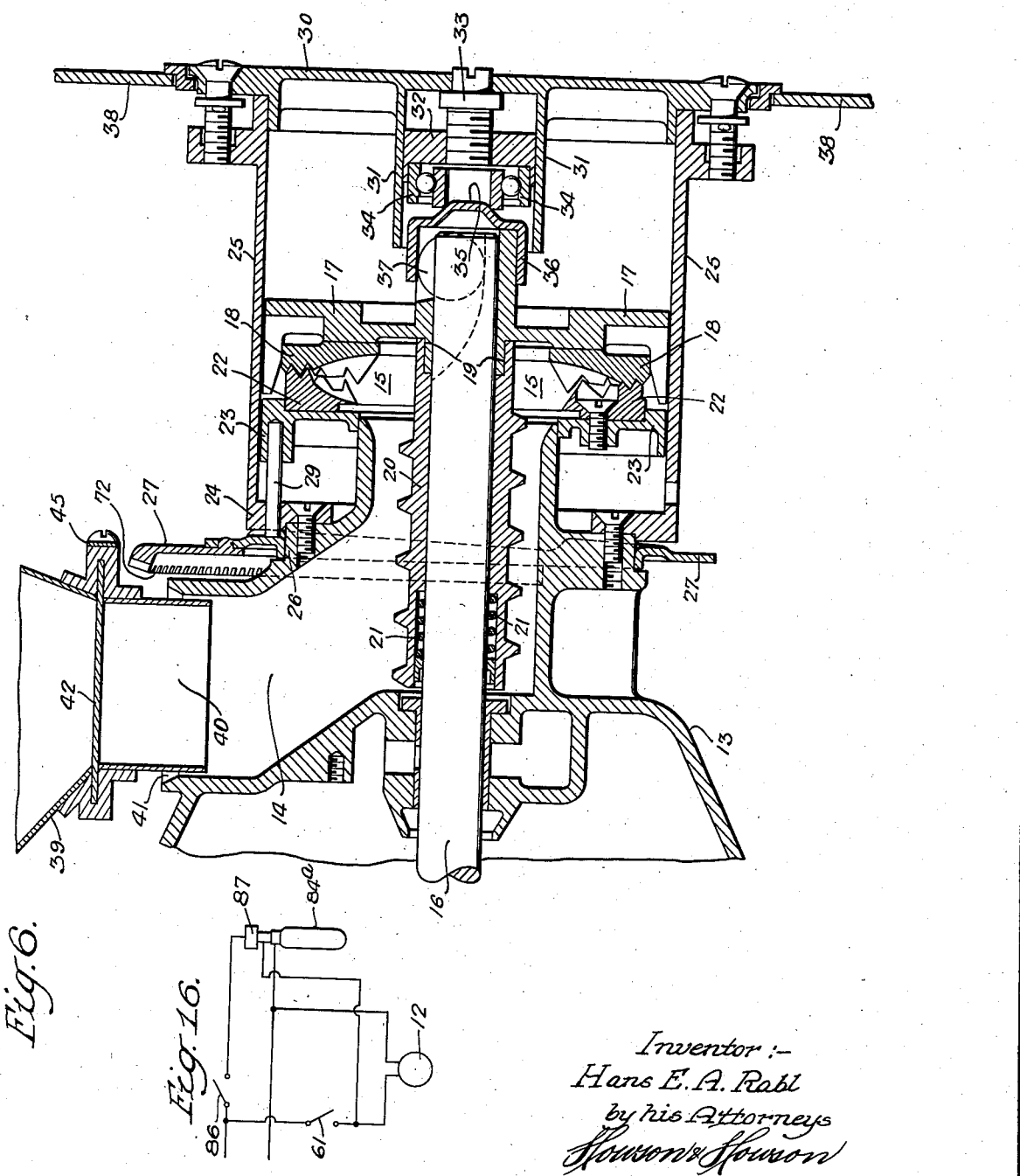

Nov. 29, 1938.  H. E. A. RABLE  2,138,204
COFFEE MILL
Filed July 9, 1936   6 Sheets-Sheet 5

Inventor:-
Hans E. A. Rabl
by his Attorneys
Howson & Howson

Nov. 29, 1938.  H. E. A. RABLE  2,138,204
COFFEE MILL
Filed July 9, 1936  6 Sheets-Sheet 6

Inventor:—
Hans E. A. Rabl
by his Attorneys
Howson & Howson

Patented Nov. 29, 1938

2,138,204

UNITED STATES PATENT OFFICE 2,138,204

COFFEE MILL

Hans E. A. Rabl, Philadelphia, Pa., assignor to The Enterprise Manufacturing Company, of Pennsylvania, Philadelphia, Pa., a corporation of Pennsylvania Application July 9, 1936, Serial No. 89,827

2 Claims. (Cl. 83—18)

This invention relates to coffee mills, and more particularly to an enclosed type of coffee mill having means to indicate to the purchaser the setting made in grinding the beans.

As is well known, different methods of coffee making require different grindings of the beans, and while the customer may specify the particular grinding necessary, the ordinary mill is relatively difficult to adjust and a hurried clerk will often fail to make the proper adjustment before grinding, trusting to the previous setting to provide a satisfactory grinding.

An important object of this invention is the provision of a mill in which it is necessary for the clerk to make an adjustment before grinding due to the fact that the mill is automatically reset at a neutral position, or rather in a position such that the fact that the product was not properly ground would immediately be evident.

A further object is the provision of a structure which will simplify the use of a telltale advising the customer of the setting.

A still further object is the general improvement of the mill structure per se in order to provide a device in which such operations as replacing the burrs may be very readily effected and in which the general assembly of the structure is greatly facilitated.

Another object of the invention is to improve the mounting of the grinding shaft of the mill in order to insure proper centering thereof at all times, and to afford a simplified means for making minor adjustments compensating for wear.

These and other objects I attain by the construction shown in the accompanying drawings wherein, for the purpose of illustration, I have shown a preferred embodiment of my invention and wherein:

Fig. 3 is a vertical sectional view therethrough;

Fig. 4 is a fragmentary side elevation of the control mechanism;

Fig. 5 is a section on line 5—5 of Fig. 4;

Fig. 6 is an enlarged sectional view through the mill unit per se;

Fig. 11 is a fragmentary perspective of the grinder housing;

Fig. 15 is a perspective view of the securing means for the casing; and

Fig. 16 is a wiring diagram of the unit.

Figure 1:
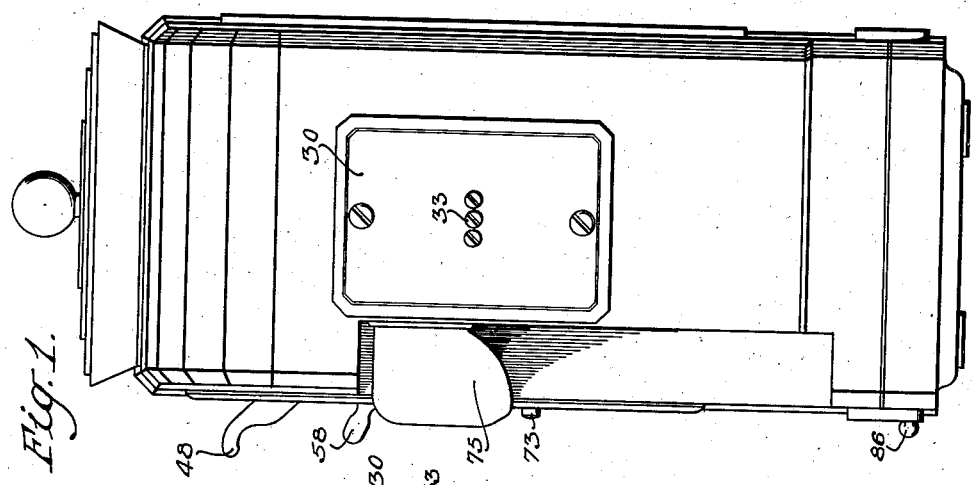
Fig. 1 is a side elevation of a mill constructed in accordance with my invention.
Figure 2:
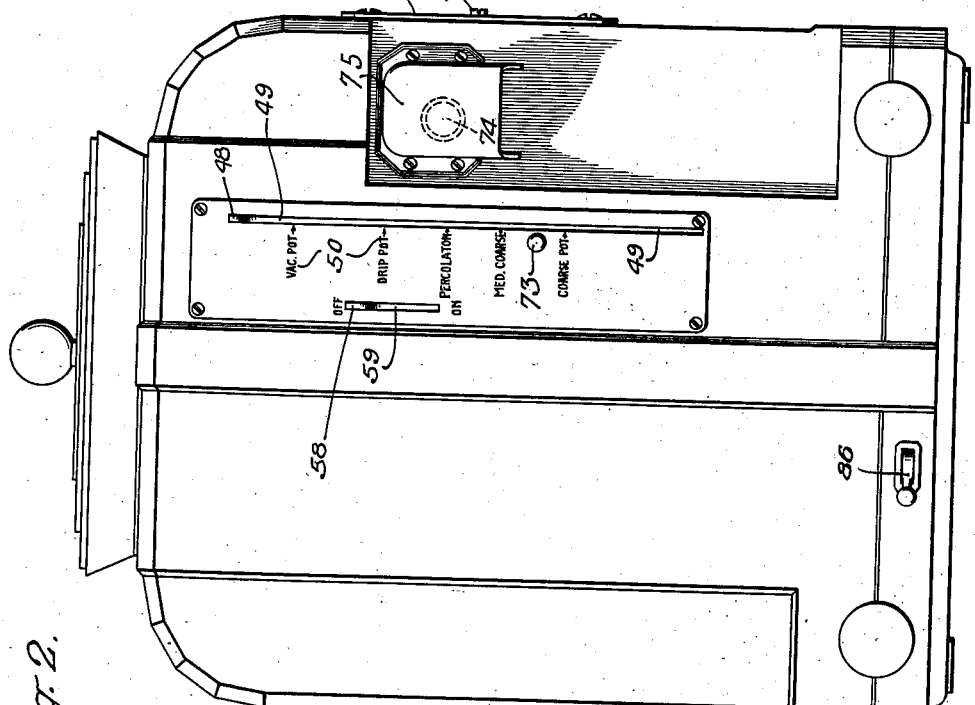
Fig. 2 is a rear elevation thereof.

Referring now more particularly to the drawings, the numeral 10 designates a suitable base having a pedestal 11 arising therefrom supporting the motor 12 of the grinding unit per se. The motor frame, in turn, supports the grinder 13 which includes a feeding spout 14 having the lower portion of its neck horizontally directed and communicating with the grinding chamber 15. The shaft 16 of the motor extends through the horizontal section of the spout 14 and has mounted thereon and keyed thereto a plate 17 bearing the rotating grinding burr 18. This plate also has secured thereto in any suitable manner as, for example, by press fitting at 19, a feed worm 20, which worm is spring pressed by a spring 21 in a direction tending to separate the rotating grinding burr from the stationary burr 22.

Figure 8:
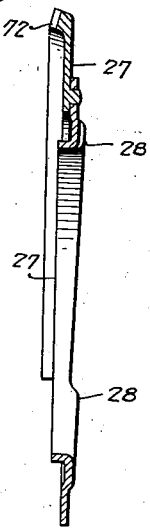
Fig. 8 is a section on line 8—8 of Figure 7.
Figure 7:
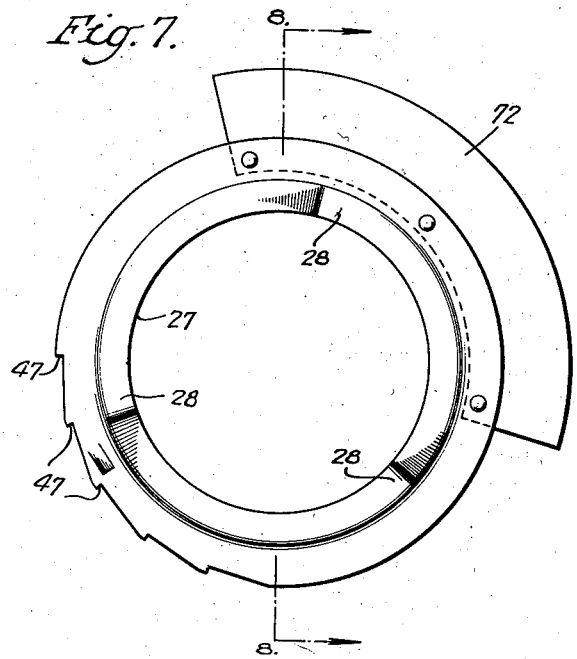
Fig. 7 is an elevation of the control cam.
Figure 10:
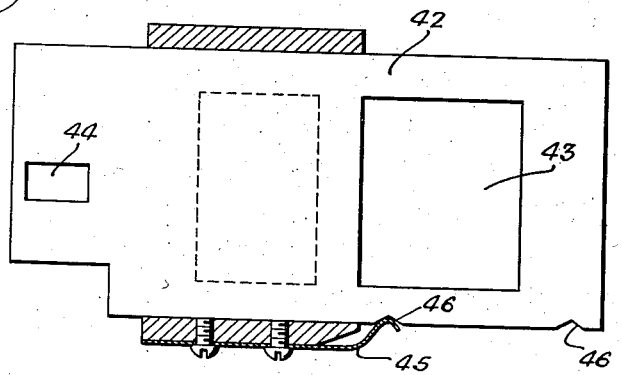
Fig. 10 is a section on line 10—10 of Figure 9.
Figure 9:
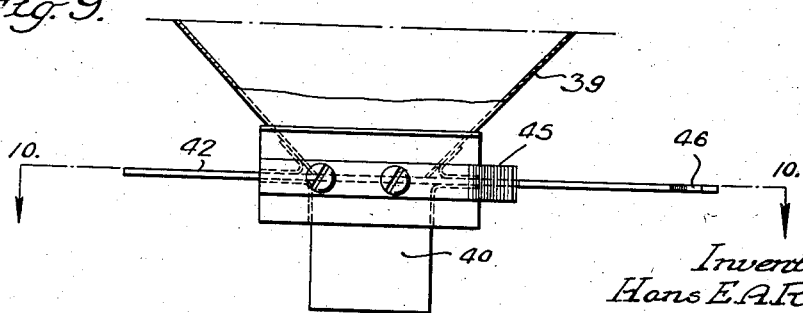
Fig. 9 is a detail fragmentary view showing the hopper gate.

While the general construction of the burrs and operation of the mill is that common to mills of this character, the arrangement employed differs materially from the usual type of mill in that instead of adjusting the rotating burr to provide different cuts, the adjustment of this burr is solely for the purpose of compensating for wear, or initial positioning thereof. The stationary burr, however, is carried by a plate 23 slidably surrounding the outlet of the spout 14. Secured to the spout is the flanged inner end 24 of a tubular casing member 25 against which the outer edges of plates 17 and 23 fit, and the outer portion of this flange opposes a shoulder 26 on the spout 14 providing an annular space for the accommodation of a rotatable adjusting member 27. The inner portion of this adjusting member, as more clearly shown in Figs. 7 and 8, is in the form of a cam 28, this cam abutting the inner ends of pins 29 projecting through flange 24 and secured to plate 23 so that they serve to hold this plate against rotation. The outer end of the tubular casing 25 mounts a removable plate 30, the central portion of which has a tubular extension 31 serving as a mounting for an adjusting plate 32 movable through screw 33 and abutting the outer race element of a thrust bearing 34. The inner race element of this bearing receives the conical inner extremity 35 of a cap 36 fitting over the end of the hub portion of plate 17, this cap serving at once as a means for retaining the key 37 of the plate 17 and as a means for centering the free end of the shaft due to the engagement of the conical portion 35 thereof with the inner race. It will be obvious that on removal of plate 30 the removal of the feed worm and burrs is a comparatively simple operation, the outer or rotary burr with the feed worm being first removed, following which the inner or stationary burr is readily accessible for removal. Thus replacements and inspection or cleaning are greatly facilitated.

The removable plate 30 closes an opening in an outer casing 38 which encloses the entire mechanism described, and provides a mounting for removable hopper 39. The hopper 39 has a discharge mouth 40 adapted to fit in the upper end of the spout 14, the spout being tapered at 41 to facilitate engagement of the outlet therein. This outlet is separated from the main body of the hopper by a slidable gate 42, which gate has an opening 43 which may be aligned with the outlet and a second opening 44 the purpose of which will presently appear. The gate is yieldably held in opened or closed position through a detent spring 45 engaging in notches 46 formed in the edge thereof. The rotatable adjusting member 27 has a portion of its periphery formed with ratchet teeth 47 and has secured thereto an operating handle 48 through which it can be rotated, this handle projecting through a slot 49 in the wall of the casing having spaced indicia 50 indicating the different types of grinds for which the burrs are set when the rotating member is in a given position.

Mounted upon a suitable bracket 51 carried by spout 14, or any other suitable support, is a ratchet 52 having a detent tooth 53 for co-action with ratchet teeth 47 and a tail 54 for co-action with a second ratchet element 55. This second ratchet element has a shoulder adapted to engage the tail of ratchet 52 and hold this ratchet in a position such that the shoulder thereof may not engage ratchet teeth 47. The rotatable adjusting member 27 has a shoulder 56 which, in the lowered or neutral position of lever 48, engages the ratchet member 55 and disengages its shoulder from the tail of ratchet 52, thus releasing the ratchet for re-engagement with the teeth 47. This bracket likewise mounts a snap switch 57 and a lever 58, which lever 58 projects through a slot 59 to the exterior of the casing. The lever includes an arm 60 engaging the operating handle 61 of the snap switch, which arm bears a pivoted trip arm 62. This trip arm co-acts with a pin 63 on the upper end of ratchet 52. When lever 58 is moved in the direction of the arrow A, this trip arm may pass over pin 63 and assume a position therebehind and at the same time the switch handle 61 is positioned in such fashion that current is supplied to the motor. When, however, the lever 58 is moved in the opposite direction, the switch is cut off and the trip arm 62 acts to disengage ratchet 52 from the rotatable adjusting member 27; at the same time ratchet 55 moves upwardly under the influence of its spring holding this member out of engagement with the teeth 47. The rotary control member is continuously stressed to rotate in the direction of the arrow B by means hereinafter described and, obviously, when the switch lever 58 is actuated, if the control lever is in any other than neutral position the adjusting member will be rotated until the control lever reaches this neutral position. In addition, the switch lever has a second arm 64 which extends through the slot 44 of the gate 42 and when the lever is moved in the direction of arrow A the gate is moved from closed to open position. Rotatably mounted upon a stub shaft 65 supported from the grinder unit is a spool 66, one end of which comprises a bevel gear 67 the opposite end of which comprises a flange affording means for attaching a disc 68, which disc bears suitable indicia designating different types of grinds, the indicia being visible through an opening 69 in the casing wall. A spring 70 connected at one end to the base has a flexible band 71 which is wound upon the spool 66 and tends to constantly rotate the disc in one direction. The periphery of the control member 27 is likewise provided with a segmental bevel gear 72 which meshes with the bevel gear 67 so that the tendency to rotation on the part of the disc is imparted to the rotary control member moving the same in the direction of the arrow B.

In use of the apparatus the handle lever 48 is moved until it properly aligns with the indicia adjacent the slot through which it operates and will be held from return by the ratchet 52. This rotation through the segment gear 72 and gear 67 is imparted to the disc against the action of spring 70. If an inaccurate selection is made, the disc may be restored to its normal or neutral position by pressing button 73 mounted on the casing wall and co-acting with the tail 54 of ratchet 52. The correct selection having been made, the switch lever 58 is moved in the direction of arrow A, thereby opening gate 42 supplying current to the motor and positioning the trip lever 62 for disengagement of the ratchet 52 when the switch lever 58 is moved in the opposite direction. When the grinding operation has been completed, the switch lever is operated to cut off the switch and this operation both closes gate 42 and releases ratchet 52, which ratchet will be held in its released position by ratchet 55 until this ratchet is, in turn, disengaged by the shoulder 56. At this time the operating handle is in its neutral position and the disc has been shifted to indicate that this is the case. In each case, of course, disc 68 will indicate the type of grind which will be delivered by the mill.

Figure 13:
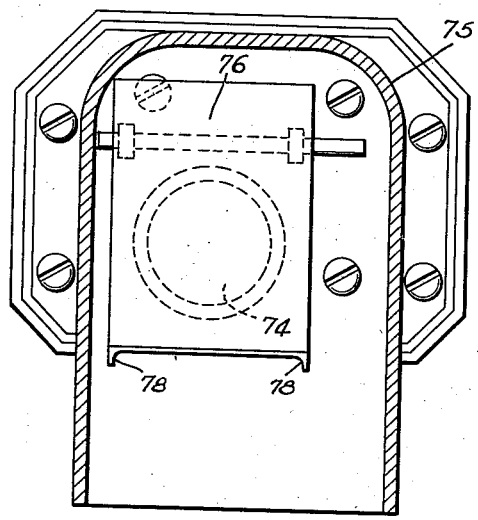
Fig. 13 is a section on line 13—13 of Figure 12.
Figure 12:
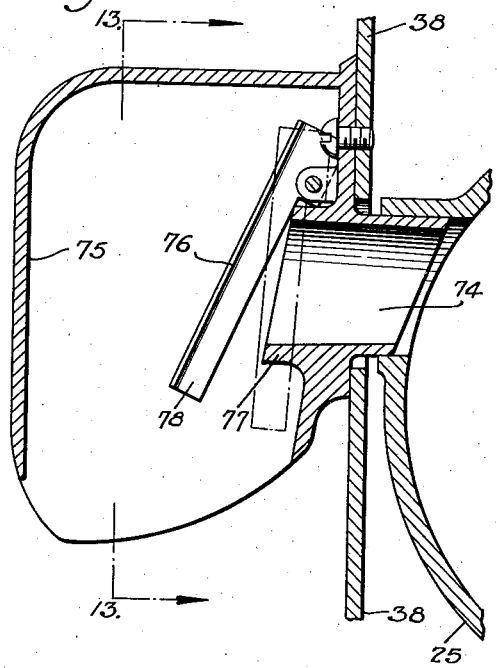
Fig. 12 is an enlarged sectional view through the outlet spout.
Figure 14:
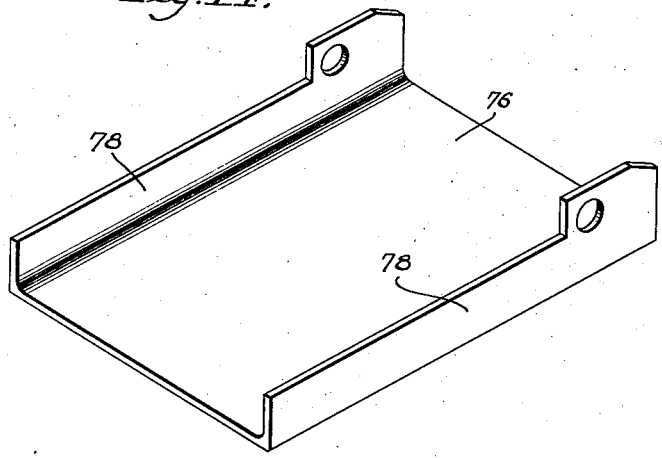
Fig. 14 is a perspective of the outlet control plate.

In order that a more cleanly discharge may be provided due to the fact that such mills are intended for counter operation, the discharge spout is preferably constructed as illustrated in Figs. 12 to 14. The casing wall carries an outlet 74 which is provided with a hood section 75 to receive the mouth of a bag to which the ground material is to be discharged. Within this hood a plate 76 is pivoted immediately above the projecting end 77 of the outlet 74, this plate being of a width slightly greater than the width of the outlet and having inturned flanges 78 at its sides which prevent material blown from the grinder by the usual discharge vanes from scattering about and so escaping from the mouth of the bag. The upper ends of the flanges are constructed to engage against the outlet wall and limit the extent of possible opening afforded by the pivotal plate.

In order that the casing 38 may fit as snugly about the mechanism as possible and thus reduce the over-all dimensions of the enclosed structure, it is essential that the walls thereof have as few protuberances as possible, thus rendering difficult the use of ordinary attaching bosses at the lower ends thereof. I, accordingly, provide the lower ends of the walls with a very shallow inwardly projecting flange 79 and form in the upper wall of the base 10 keyhole slots 80 adjacent the narrow portions of which the lower face of this wall is provided with a lug 81. An angle piece 82, one arm of which is formed with a hook 83 to engage over the flange 79, then has this arm of the angle slipped through the large portion of the keyhole slot 80 and after engagement of the hook 83 over the flange is moved into the narrow portion of the slot and then secured by screws 84. The lug 81 acts as a pivot about which the second arm of the angle may rock, thus bringing the hook 83 into firm engagement with the flange 79 and securing the casing in position upon the base.

Inwardly of the opening 69 I arrange an illuminating bulb 84a, at least those portions 85 of the indicator disc 68 which are intended for alignment with the opening being made translucent so that indicia arranged in these elements may be clearly observed. This illuminating bulb is in circuit with a main switch 86 controlling the supply to the mill, this circuit likewise including a flasher button 87 so that when the main switch is closed the lamp 84a will be intermittently operated. It is also in circuit with switch 61 and this circuit does not include flasher button 87, with the result that during periods when the mill is not in actual operation the light is intermittently operated, calling attention to a suitable indicia which may take the form of an inquiry as to what type of grind the customer desires, while, when the mill is in operation, this lamp shines steadily.

Since the detailed construction hereinbefore set forth is obviously capable of considerable modification without departing from the spirit of my invention, I do not wish to be understood as limiting myself thereto except as hereinafter claimed.

I claim:

1. In a coffee mill, a feed spout, a plate longitudinally adjustable upon said spout, means to adjust said plate, a burr carried thereby, a shaft extending through the spout, means to rotate said shaft, a second plate secured to said shaft, a burr carried by said second plate, a tubular housing rigidly secured to said spout and slidably receiving the peripheral portions of said plates, a removable closure plate for the end of said housing and an adjusting means carried by said closure plate and operatively engaging the burr carried by the second plate.

2. In a coffee mill, a feed spout, a plate longitudinally adjustable upon said spout, a burr carried thereby, a shaft extending through the spout, means to rotate said shaft, a second plate secured to said shaft, a burr carried by said second plate, a housing rigidly secured to said spout and slidably receiving the peripheral portions of said plates, a removable closure plate for the outer end of said housing, a thrust bearing embodying inner and outer races adjustably supported from said plate through the outer race thereof and a tapered member upon the end of said shaft engaging the inner race of said thrust bearing.

HANS E. A. RABL.